Sept. 14, 1926.  1,599,916
J. R. NYE
DOUGHNUT FRYING MACHINE
Filed March 7, 1924  2 Sheets-Sheet 1
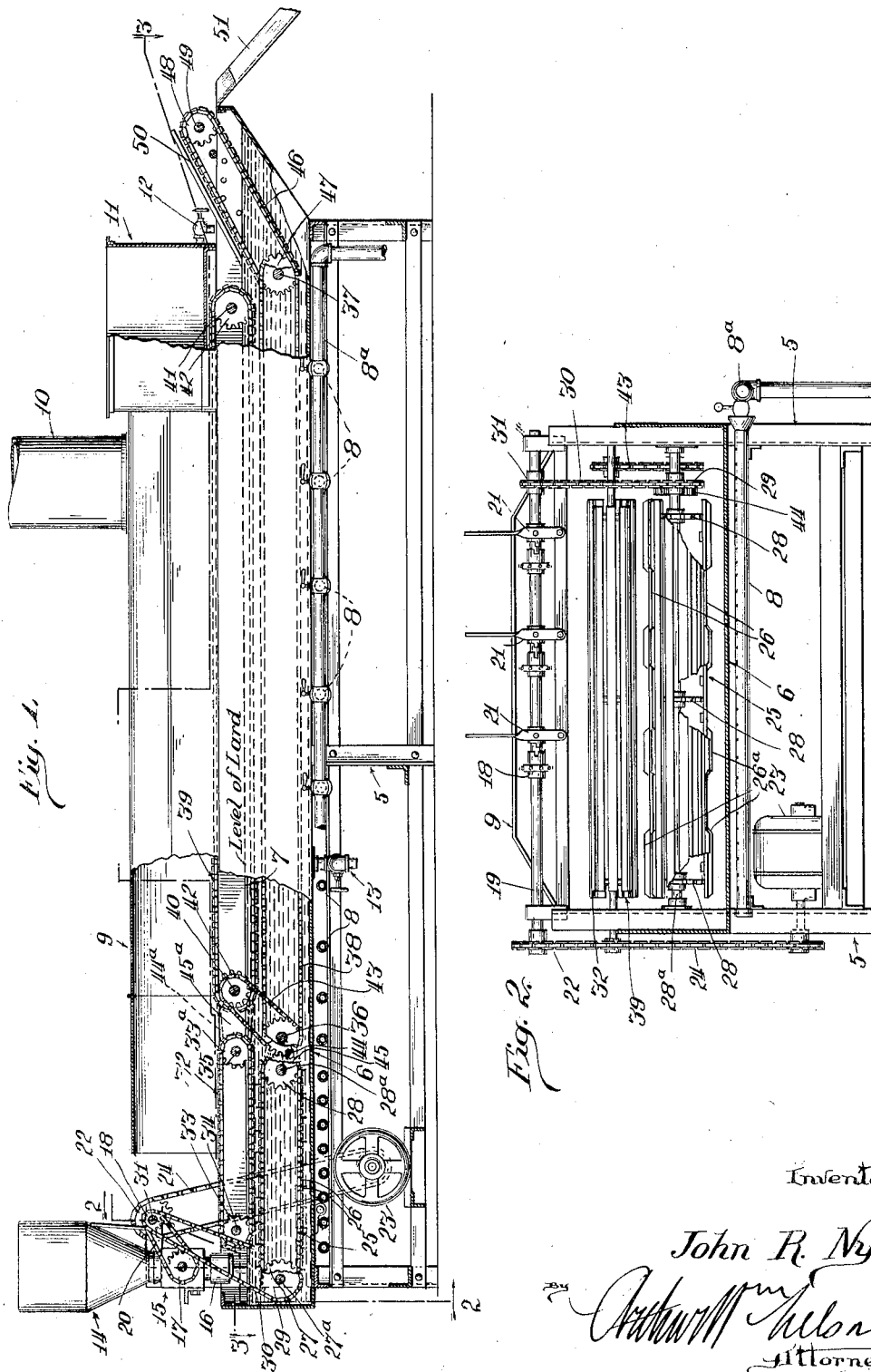
Inventor
John R. Nye
Attorney Sept. 14, 1926.
J. R. NYE
1,599,916
DOUGHNUT FRYING MACHINE
Filed March 7, 1924
2 Sheets-Sheet 2
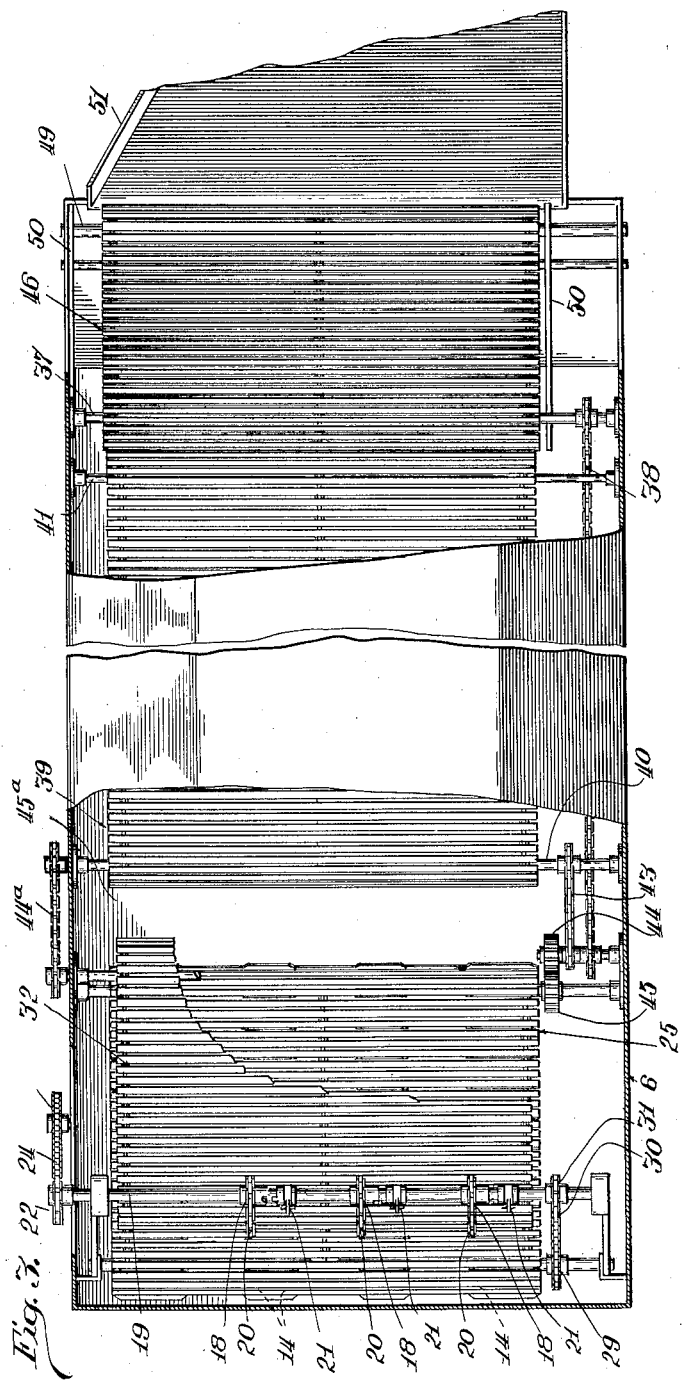
Inventor
John R. Nye Patented Sept. 14, 1926.

1,599,916

UNITED STATES PATENT OFFICE.

JOHN R. NYE, OF CHICAGO, ILLINOIS.

DOUGHNUT-FRYING MACHINE.

Application filed March 7, 1924. Serial No. 697,564.

This invention relates to improvements in apparatus for making doughnuts and the like and consists of the matters hereinafter described and more particularly pointed out in the appended claims.

One of the objects of the present invention is to provide an efficient apparatus for making doughnuts in large quantities, wherein the doughnuts are kept submerged and in movement in the hot melted lard or like cooking fluid, from the time the uncooked doughnuts are dropped into the lard at one end of the apparatus until they emerge from the lard at the other end of the apparatus, as crispy, brown, cooked doughnuts.

This object of the invention, as well as others, together with the many advantages thereof, will more fully appear as I proceed with my specification.

In the drawings:—

Fig. 1 is a view partly in side elevation and partly in longitudinal vertical section of an apparatus or machine for making doughnuts and the like, embodying my invention.

Fig. 2 is a vertical transverse sectional view through one end thereof, as taken on the line 2—2 of Fig. 1.

Fig. 3 is a view partly in plan elevation and partly in horizontal section, as taken on the broken line 3—3 of Fig. 1.

Fig. 4 is a detail perspective view of a part of one of the conveyers embodied in my improved apparatus and which will be more described later.

Referring now in detail to that embodiment of the invention illustrated in the accompanying drawings, 5 indicates the frame of the apparatus which is made of angle iron and 6 indicates an elongated open top tank, mounted thereon for the purpose of containing a suitable cooking fluid, such as hot melted lard or the like, which fluid is preferably maintained at a level indicated by the line 7. The fluid in the tank is heated by a plurality of transversely extending, gas burner pipes 8 which are connected to a longitudinal header or supply pipe 8ª arranged at one side of the machine, the burner pipes being arranged in close proximity to the bottom wall of the tank 6. I arrange the burners 8 closer together at the end of the machine into which the uncooked doughnuts are dropped so that the lard or cooking fluid will be hotter at that point. This causes the uncooked doughnut to be very quickly provided with a crust which preserves them from breakage by the action of the machine parts. Under the lesser temperature of the remaining cooking fluid the doughnuts can then be cooked throughout without danger of burning them. Of course, instead of placing the burners closer together at the receiving end of the machine the same result could be secured by providing larger burners, as the desired result is to maintain a higher temperature in that part of the machine. A hood 9 covers the major portion of the open top of the tank, which hood terminates short of the ends of the tank. To the top wall of the hood is connected a flue 10 which carries the smoke and odors, generated by the cooking fluid, to a stack (not shown) from which it passes to the outside atmosphere. Above the discharge end of the tank 5 (that is above that end of the tank from which the cooked doughnuts are discharged as will appear later) and at one end of the hood 9 is a transversely extending auxiliary supply tank or reservoir 11 for holding a reserve of lard, which is heated to a melted state by the heat arising from the fluid in the main tank 6. A draw-off valve 12 is provided in said reservoir which is adapted to discharge into the tank 6, so that the fluid in the tank 6 may be replenished as it is used, and the level therein maintained substantially constant. At about midway between the ends of the main tank and in the bottom wall thereof is a discharge pipe and valve 13 by means of which the fluid may be drawn from the tank when so desired.

Above that end of the tank opposite the discharge end and extending transversely thereof is a plurality of dough hoppers 14 as shown in Fig. 1 and as indicated in dotted lines in Fig. 3. At the bottom of each hopper is a doughnut forming mechanism 15 with a downwardly opening discharge mouth 16 which drops the formed but uncooked doughnuts into the cooking fluid in the tank 6. As the specific construction of the doughnut forming mechanism forms no part of the present invention it is not illustrated in detail nor need it be more fully described here. Each forming mechanism is actuated by a short stub shaft extending transversely of the apparatus and upon each of said shafts is fixed a sprocket 17. All of said sprockets are driven from associated sprockets 18 loose on a transverse drive shaft 19, by means of chains 20. Associated with each sprocket 18 is a clutch collar 21 (see Fig. 2), by means of which said sprockets 18 may be operatively connected to said shaft 19 to be driven thereby. At one end of the shaft 19 beyond the vertical plane of the associated side wall of the tank 6 is a sprocket 22 which is operatively driven from a motor 23 on the frame 5, below the tank 6, by a sprocket and chain 24.

In that end of the tank 6 below the hopper 14 is an endless conveyer 25. This conveyer is preferably of the slatted type and consists of the usual pair of sprocket chains to which are fixed the ends of transversely extending slats 26, said conveyor being mounted on sprockets 27 and 28 which are secured to transverse shafts 27ª, 28ª, respectively, suitably journalled in the side walls of the tank 6. Said conveyer is so arranged as to be entirely submerged in the cooking fluid and to certain predetermined ones of the slats 26 are secured upright, transversely spaced flanges or flights 26ª, the spaces between the flights on each slat being arranged in the plane of the hoppers and forming mechanisms 14 and 15, respectively, as shown in Fig. 2. In operation, the top lap of the conveyer moves toward the discharge end of the tank, while the bottom lap moves toward the other end of the tank and thus the flights assist in establishing a circulation of the cooking fluid in said tank. The conveyer 25 is driven by a sprocket 29 and chain 30 from another sprocket 31 on that end of the shaft 19 opposite the sprocket 22, before mentioned.

Associated with the conveyor 25 is a conveyer 32 also preferably of the wood slat type which is mounted on sprockets 33—33ª on transverse shafts 34 and 35. This conveyer is so located and arranged in the tank that its bottom lap is submerged in the cooking fluid and is spaced a short distance above the top lap of the conveyer 25 and moves at the same speed and in the same direction as said top lap of the conveyer 25.

36 and 37 indicate transverse shafts which are journalled in the side walls of the tank near the shaft 28ª and near the discharge end of the tank respectively, said shafts being operatively connected together by a sprocket chain 38. A third conveyer 39 is located in the tank, preferably in the plane of the conveyer 32 and between said last mentioned conveyer and the discharge end of the tank. Said conveyer 39 is mounted on cross shafts 40 and 41 respectively by means of suitable sprockets 42 and the shaft 40 is driven by a chain 43 from the shaft 36, which shaft is operatively connected by gears 44 and 45 to the shaft 28ª (see Fig. 3). The shaft 40 is, in turn, operatively connected to the shaft 35 by a sprocket chain 44ª so as to drive the conveyer 32 in the proper direction. Preferably, but not necessarily so, the bottom lap of the conveyer is located in a plane below that of the conveyer 32, it being apparent that a gap or space 45ª is formed between the adjacent ends of the conveyers 32 and 39.

At the discharge end of the tank 6 is provided a fourth or discharge conveyer 46 of the slatted type which is arranged in an inclined plane, with one end submerged in the cooking fluid and its other end arranged in a plane above that of the tank 6. The said conveyer is mounted on sprockets 47 and 48, respectively, the first of which is mounted on the shaft 37 and the other of which is mounted on a shaft 49 journalled on the top edges of the tank 6. At the sides of the discharge conveyer are upright flanges or guards 50, said conveyer discharging the doughnuts from the cooking fluid into a chute 51 which directs the cooked doughnuts into suitable receptacles provided to receive the same.

The operation is as follows:—

Assume that the cooking fluid is at the desired level in the tank and has been heated to the desired temperature by the burner pipes 8. With the proper amount of dough in the hoppers 14, the clutches 21 are actuated to operatively connect the forming mechanisms 15 with the shaft 19 so as to actuate said mechanisms. As the formed uncooked doughnuts drop from the discharge mouths 16 into the cooking fluid above the adjacent end of the conveyer 25 they will float at the level of the cooking fluid. In the operation of the conveyer 25 and by reason of the flanges or flights 26, the said fluid at this point is moving or circulating towards the opposite end of the apparatus, the doughnuts being carried along in this movement or circulation, toward the conveyer 32. Said conveyer by reason of its bottom lap being located in the fluid, will, of course, act to completely submerge the doughnuts so that they will be entirely covered by the fluid and will therefore cook uniformly. By submerging the doughnuts now being cooked, they cannot become exposed to the air on the top sides, such exposure causing the doughnuts to crack open and become uneven in form and texture, which affects their appearance as well as their salability. By reason of the flotation of the doughnuts, they are carried or moved rearwardly between the conveyers 25 and 32 without injury and when they arrive at the gap 45, they distribute themselves transversely of the machine by flotation and are then engaged by the bottom lap of the conveyer 39 which again submerges them in the fluid and carries them along toward the rear or discharge end of the apparatus, where they move toward the discharge conveyer which picks them up and discharges them upon the chute, the excess fluid on the cooked doughnuts, draining therefrom, while on the discharge conveyer, back into the tank 6, so that the doughnuts are freed from such excess and, therefore, cannot become fluid soaked or soggy. Of course, as it will be understood, the operation of the apparatus is intended to be continuous so that the cycle of operation just described is only an illustration of one dropping of uncooked doughnuts from the discharge mouths 16. By spacing the flanges or flights 26ª on the slats of the conveyer 25, the doughnuts do not fall upon said flights to be injured or cut thereby, but fall upon the flat slats of the conveyer. As the cooking fluid is used up in the making of doughnuts, the desired level of said fluid may be maintained by opening the valve 12 to draw from the reservoir a sufficient amount of fluid to compensate for that used in the operation of the machine.

The apparatus has a large capacity; is sanitary, as the doughnuts are not touched by the hands; is economical in the use of fluid and reduces the number of unsalable doughnuts on account of their appearance and mis-shape to a minimum.

Doughnuts of different sizes can be readily made by merely changing the dies in the doughnut cutting machines and then by regulating the speed of the conveyers. For the larger doughnuts the conveyers should move more slowly than for the smaller doughnuts. Because of the time relation of the doughnut cutting machines with the conveyers in the frying medium there is no danger of one doughnut falling upon the preceding one or upon the upright members 26. The machine is therefore very flexible as to the product which it can properly handle.

While in describing my invention, I have referred to certain details of construction and arrangement of parts thereof, I do not wish to be limited thereto except as may be pointed out in the appended claims.

I claim:—

1. In an apparatus of the kind described, the combination of a tank for holding a cooking fluid, means at one end of the tank for feeding uncooked doughnuts into said fluid, a conveyer located in said tank below the level of the fluid therein, said conveyer having flights for producing a circulation of said fluid and in which the doughnuts will float, a device arranged above said conveyer and coacting therewith to hold the doughnuts submerged in said fluid, a second conveyer spaced forwardly of said device thus providing a gap between them permitting a lateral distribution of the doughnuts by free floating, said second conveyer having its bottom lap submerged in the fluid and acting to engage the floating doughnuts and to move them submerged in the fluid toward the other end of the tank, and means at said other end of the tank for removing the cooked doughnuts therefrom.

2. In an apparatus of the kind described, the combination of a tank for holding a cooking fluid, means at one end of the tank for feeding uncooked doughnuts into said fluid, a conveyer located in said tank below the level of the fluid therein, a second conveyer in said tank above the first conveyer for coacting therewith to hold the doughnuts submerged in said fluid, one of said conveyers having flights thereon for establishing a circulation of the fluid towards the other end of said tank, means in said tank spaced forwardly from said conveyers and extending toward the other end of said tank and providing a gap between said conveyer and said means permitting a lateral distribution of the doughnuts by free floating, said means acting to engage the floating doughnuts and to move them submerged through the fluid toward said other end of the tank, and means for removing the doughnuts from said other end of the tank, when released from the action of said means spaced forwardly from said conveyers.

3. In an apparatus of the kind described, the combination of a tank for holding a cooking fluid, means at one end of the tank for feeding uncooked doughnuts into said fluid, a conveyer located in said tank below the level of the fluid therein, a second conveyer in said tank above the first conveyer for coacting therewith to hold the doughnuts submerged in said fluid, one of said conveyers having flights thereon for establishing a circulation of the fluid towards the other end of said tank, a third conveyer spaced forwardly of said other conveyers and extending toward said other end of the tank and providing a gap between said third conveyer and the other conveyers permitting a lateral distribution of the doughnuts by free floating, said third conveyer acting to engage the floating doughnuts and to move them toward said other end of the tank, and a fourth conveyer for removing the cooked doughnuts from said other end of the tank.

4. In an apparatus of the class described, the combination of a tank for holding a cooking fluid, means adjacent one point for feeding uncooked doughnuts into said fluid, means for holding said doughnuts temporarily in spaced relation and for moving them away from the feed point, other means for moving said doughnuts, said first mentioned moving means terminating short of the second mentioned means, thereby providing a gap which enables the doughnuts by flotation to distribute themselves laterally before being brought under the influence of the second moving means.

In testimony whereof, I have hereunto set my hand, this 4th day of March, 1924.

JOHN R. NYE.